United States Patent
Fukuda

(10) Patent No.: US 7,359,337 B2
(45) Date of Patent: Apr. 15, 2008

(54) COMMUNICATION SYSTEM, TRANSMISSION TERMINAL AND RECEIVING TERMINAL THEREFOR

(75) Inventor: Kazuma Fukuda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 848 days.

(21) Appl. No.: 10/467,052

(22) PCT Filed: Dec. 18, 2001

(86) PCT No.: PCT/JP01/11103

§ 371 (c)(1), (2), (4) Date: Aug. 18, 2003

(87) PCT Pub. No.: WO03/053011

PCT Pub. Date: Jun. 26, 2003

(65) Prior Publication Data

US 2004/0071170 A1  Apr. 15, 2004

(51) Int. Cl.
*H04L 1/00* (2006.01)

(52) U.S. Cl. ..................... 370/253; 370/231
(58) Field of Classification Search .............. 370/230, 370/231, 235, 310, 352, 466, 503, 232, 233, 370/234, 252, 253, 328, 329; 375/266, 371
See application file for complete search history.

(56) References Cited

U.S. PATENT DOCUMENTS 5,692,009 A * 11/1997 Iijima ..................... 375/226
5,790,543 A * 8/1998 Cloutier .................... 370/252
6,075,769 A * 6/2000 Ghanwani et al. ........... 370/229
6,603,822 B2 * 8/2003 Brede et al. ................. 375/340

FOREIGN PATENT DOCUMENTS

| JP | 2001-160824 | 6/2001 |
|---|---|---|
| JP | 2001-230809 | 8/2001 |
| WO | WO 01/67709 A2 | 9/2001 |

OTHER PUBLICATIONS

Schulzrinne et al., RFC 1889—RTP: A Transport Protocol For Real-Time Applications, Jan. 1996, pp. 24-30.*

(Continued)

*Primary Examiner*—Ricky Q. Ngo
*Assistant Examiner*—Pao Sinkantarakorn
(74) *Attorney, Agent, or Firm*—Oblon, Spivak, McClelland, Maier & Neustadt, P.C.

(57) ABSTRACT

A communication system, including: a transmitting terminal configured to transmit a plurality of data packets; and a receiving terminal configured to receive the plurality of data packets, wherein the receiving terminal is configured to calculate a first jitter moving average from a transmitting time and a receiving time of each packet received by the receiving terminal based on positive-valued jitter and negative-valued jitter, to calculate a second jitter moving average from the transmitting time and receiving time of each packet received by the receiving terminal based only on positive-valued jitter, and to send the first and the second jitter moving averages to the transmitting terminal, and the transmitting terminal is configured to predict an available bandwidth on a communication path between the transmitting terminal and the receiving terminal based on a comparison of the first and second jitter moving averages.

14 Claims, 4 Drawing Sheets

OTHER PUBLICATIONS

Shugo Kato et al.: "A traffic control scheme of live video and audio for PHS with a 64kbps bearer service of best effort type" Technical Report of IEICE, CS99-158, CQ99-81, pp. 61-66, Feb. 2000 (with English translation).

Seiji Okumura et al., "MPEG-4 over RTP Haishin System (2)", Jouhou Shori Gakkai, Dai 60kai (Heisei 12nen Zenki/ the 1st half year of 2000) Zenkoku Taikai Kouen Ronbunshuu (3), pp. 3-327 to 3-328, 3R-3, Shadan Houjin Jouhou Shori Gakkai, Mar. 14, 2000 Full Text; all drawings.

Tsugihiko Ohno et al., "MPEG-4 over RTP Haishin System (1) ", Jouhou Shori Gakkai Dai 60kai (Heisei 12nen Zenki/the 1st half year of 2000) Zenkoku Taikai Kouen Ronbunshuu (3), p. 3-325, 3R-2, Shadan Houjin Jouhou Shori Gakkai, Mar. 14, 2000 Full Text; all drawings.

* cited by examiner

COMMUNICATION SYSTEM, TRANSMISSION TERMINAL AND RECEIVING TERMINAL THEREFOR

TECHNICAL FIELD

The present invention relates to a communication system, transmitting terminal and a receiving terminal which implement an efficient packet delivery in a communication environment containing a radio path.

BACKGROUND ART

The deterioration of the operating condition for a packet communication in a wire environment is attributable to the congestion resulting from concentration of many packets in a narrow-bandwidth path which forms a communication bottleneck; usually, reduction in the bandwidth is not caused by worsening of the connecting condition of the path itself. That is, the upper limit of the overall bandwidth available on the path is fixed. Accordingly, the quality of communication between transmitting and receiving terminals could be improved by detecting the congestion on the path and performing delivery control in accordance with the congestion.

On the other hand, the deterioration of the operating condition for a packet communication in the radio environment is affected not only by the packet congestion but also by aggravation of the communication circumstance due to a change in the connecting condition of the radio path.

Generally, the bit error rate of the communication in the radio environment is higher than that in the wire environment, and in the packet communication a packet containing a bit error is often regarded as invalid (i.e., a packet loss) in its entirety. For that, in many instances, an error correcting mechanism deals with the packet loss by resending the packet being lost or sending a redundant packet from the transmitting terminal in a data link layer or lower than that layer.

With the presence of the error correcting mechanism, however, it appears from the user side that the actual packet loss probability is not so high as the bit error rate. But, when the delay time by processing in the error correcting mechanism increases, it is observed as if a decrease in the throughput or in the available bandwidth is caused. As a result, the available bandwidth itself also undergoes variations. That is, the upper limit of the overall bandwidth available on the path also varies.

If the packet delivery is continued in spite of such variations, the situation will also arise where the packet transfer in excess of the available bandwidth continues, which causes a further increase in the delay or packet loss. This leads to quality deterioration of continuous media information or the like in particular which needs to be delivered on a real-time basis.

In the radio environment the communicating conditions become deteriorated typically when a mobile terminal makes handover. As a delivery control scheme adaptable to a change in the conditions of communication by handover, there is, for example, "A Traffic Control Scheme of Live Video and Audio for PHS with a 64 kbps Bearer Service of Best Effort Type," Technical Report of IEICE, CQ99-81 (2000-02). This scheme is to measure RTT (Round-Trip-Time) between transmitting and receiving terminals and control the packet delivery according to the measured RTT value.

In addition, it is also considered to utilize intact a scheme which performs communication control according to the congestion in the wire environment. In particular, many systems using such a scheme monitor the congestion by detecting the packet loss. But the scheme based on the packet loss detection is a postprocessing type.

Since the conventional communication system has such a configuration as described above, if the communicating conditions are badly deteriorated as in the case of handover, it is possible to cope with such a situation in the postprocessing manner, but since the bandwidth available on the radio path is undetectable, it is impossible to perform appropriate packet delivery control in accordance with the communication environment.

The present invention is intended to solve such a problem as mentioned above and has for its object to provide a communication system and a transmitting terminal which permit detection of an available bandwidth in the radio path and hence ensure an appropriate packet delivery.

Furthermore, the present invention has for its object to provide a receiving terminal which is capable of offering information necessary for a transmitting terminal to detect an available bandwidth in the radio path.

DISCLOSURE OF THE INVENTION

A communication system according to an aspect of the present invention has a configuration in which the receiving terminal calculates a jitter moving average from the transmitting and the receiving time of each packet received by the receiving terminal and sends the calculated jitter moving average to the transmitting terminal and, based on the jitter moving average, the transmitting terminal predicts an available bandwidth on the radio path based.

With this configuration, it is possible to provide an appropriate packet delivery in accordance with the radio environment.

A communication system according to another aspect of the present invention has a configuration in which the receiving terminal sends to the transmitting terminal a jitter moving average calculated taking only positive-valued jitter into account and a jitter moving average calculated taking into account negative-valued jitter as well as the positive-valued jitter, and the transmitting terminal compares the both moving averages and predicts an available bandwidth taking the result of comparison into account.

With this configuration, it is possible to make an accurate prediction of the available bandwidth in the radio path.

A communication system according to another aspect of the present invention has a configuration in which when the jitter moving average calculated taking account into account not only positive- but also negative-valued jitter is larger than the jitter moving average calculated taking into account only the positive-valued jitter, the available bandwidth is predicted based on the jitter moving average calculated taking into account only the positive-valued jitter.

With this configuration, it is possible to avoid the possibility of the available bandwidth being predicted narrower than in the actual condition of communication.

A communication system according to another aspect of the present invention has a configuration In which when the jitter moving average calculated taking account into account not only positive- but also negative-valued jitter is smaller than the jitter moving average taking into account only the positive-valued jitter, the available bandwidth is predicted based on the jitter moving average of jitter calculated taking account into account not only positive- but also negative-valued jitter, the available bandwidth is predicted based on the jitter moving average calculated taking into account only the positive-valued jitter, and an average of the results of both predictions is used as a final result of prediction.

With this configuration, it is possible to decrease the bandwidth to a desired appropriate value even under poor conditions of communication.

A communication system according to another aspect of the present invention has a configuration in which the difference between the jitter moving average calculated taking only positive-valued jitter into account and the jitter moving average calculated taking into account not only positive- but also negative-valued jitter and the result of the previous prediction is updated in accordance with the ratio of the difference to a predetermined threshold value.

With this configuration, it is possible to make an accurate prediction of the available bandwidth in the radio path.

A communication system according to another aspect of the present invention is configured to control the amount of packets to be sent in accordance with the available bandwidth.

With this configuration, it is possible to send an appropriate amount of packets.

A communication system according to another aspect of the present invention is configured to control the packet send interval in accordance with the available bandwidth.

With this configuration, it is possible to send packets at appropriate intervals.

A communication system according to another aspect of the present invention is configured to designate a packet error correcting scheme in accordance with the available bandwidth.

With this configuration, it is possible to use an appropriate packet error correcting scheme.

A communication system according to another aspect of the present invention has a configuration in which the transmitting terminal is connected to a wire path and the receiving terminal is connected to a radio path.

With this configuration, it is possible to apply the system to a communication system in which the receiving terminal is connected to the radio path.

A communication system according to another aspect of the present invention has a configuration in which the transmitting terminal is connected to a radio path and the receiving terminal is connected to a wire path.

With this configuration, it is possible to apply the system to a communication system in which the transmitting terminal is connected to the radio path.

A communication system according to another aspect of the present invention has a configuration in which transmitting and receiving terminal are both connected to a radio path.

With this configuration, it is possible to apply the system to a communication system in which the transmitting and receiving terminals are both connected to a radio path.

A communication system according to another aspect of the present invention has a configuration in which transmitting and receiving terminals are both connected to a wire path and a mobile terminal is provided in the communication environment to relay packets from the transmitting terminal to the receiving terminal.

With this configuration, it is possible to apply the system to a communication system in which the mobile terminal is provided on the communication path to relay packets.

A communication system according to another aspect of the present invention has a configuration in which the receiving terminal calculates a moving average of a reception delay time from each packet reception time and sends the calculated moving average to the transmitting terminal and, based on the moving average of the reception delay time, the transmitting terminal predicts the available bandwidth in the radio path.

With this configuration, it is possible to provide an appropriate packet delivery in accordance with the radio environment.

A transmitting terminal according to another aspect of the present invention is adapted to predict the available bandwidth on a radio path based on the jitter moving-average received from the receiving terminal.

This provides an appropriate packet delivery in accordance with the radio environment.

A receiving terminal according to still another aspect of the present invention is adapted to calculate the jitter moving average from the time of transmission of each packet from the transmitting terminal and the time of reception of the packet and send the calculated moving average to the transmitting terminal.

This makes it possible to provide information necessary for the transmitting terminal to detect the available bandwidth on the radio path.

BEST MODE FOR CARRYING OUT THE INVENTION

To facilitate a better understanding of the present invention, a detailed description will hereinafter be given, with reference to the accompanying drawings, of the best mode for carrying the invention.

FIRST EMBODIMENT

Figure 1:
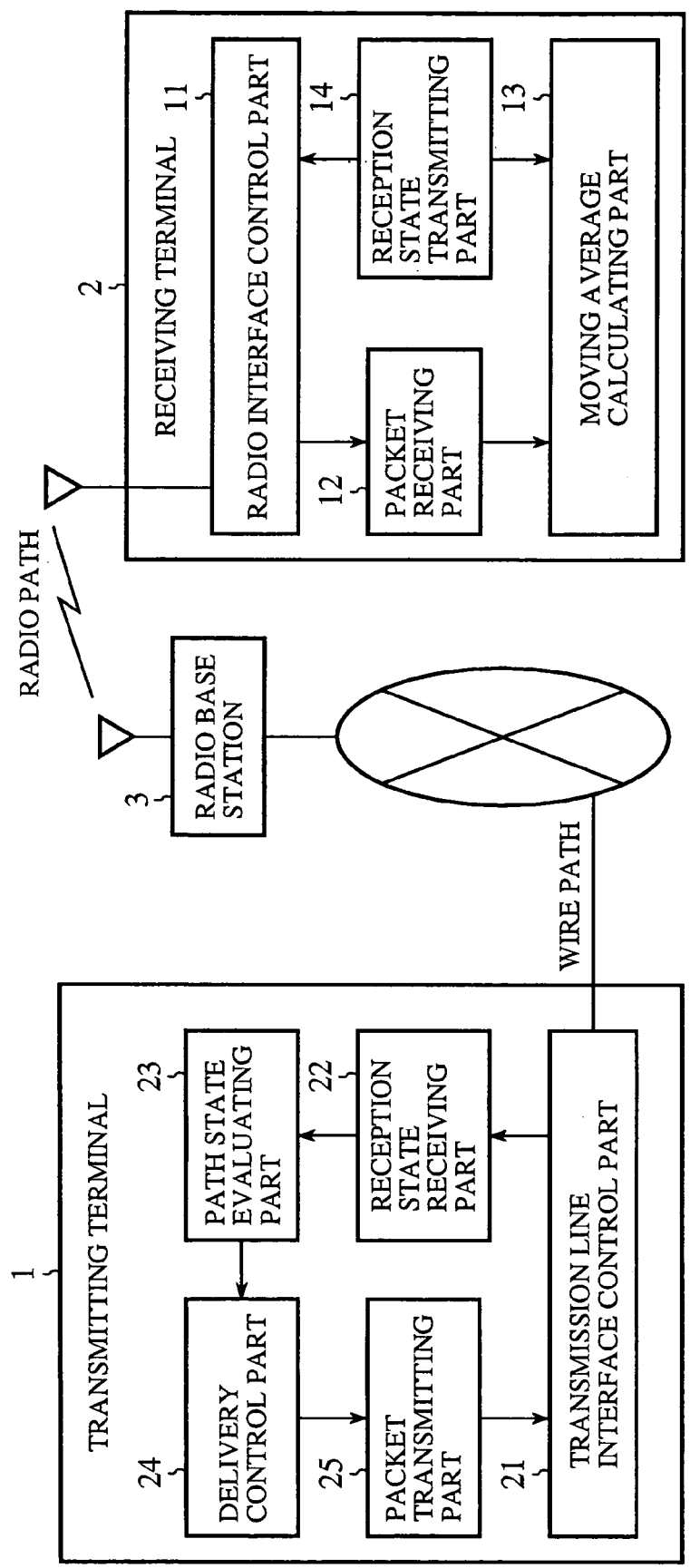
FIG. 1 is a block diagram illustrating a communication system according to a first embodiment of the present invention.

FIG. 1 is a block diagram illustrating a communication system according to a first embodiment of the present invention. In FIG. 1, reference numeral 1 denotes a transmitting terminal connected to a wire path to send packets, 2 denotes a receiving terminal connected via a radio path to a radio base station 3 to receive packets from the transmitting terminal 1, and 3 the radio base station.

Reference numeral 11 denotes a radio interface control part; 12 denotes a packet receiving part for receiving packets sent from the transmitting terminal 1; 13 denotes a moving average calculating part for calculating a moving average of jitter from the time of transmission of each packet and the time of reception of the packet received by the packet receiving part 12; and 14 denotes a reception state transmitting part which sends the moving average of jitter calculated by the moving average calculating part 13, as a report indicating the state of reception, to the transmitting terminal 1.

Reference numeral 21 denotes a transmission line interface control part; 22 denotes a reception state receiving part for receiving the report sent from the receiving terminal 2; 23 denotes a path state evaluating part which detects the moving average of jitter from the report received by the reception state receiving part 22 and, based on the moving average of jitter, predicts an available bandwidth in the radio path; 24 denotes a delivery control part for controlling the amount of packets to be sent and their sending interval in accordance with the available bandwidth predicted by the path state evaluating part 23; and 25 a packet transmitting part for sending packets to the receiving terminal 2 under the control of the delivery control part 24.

Next, the operation of this embodiment will be described below.

In the first place, when packets are sent from the packet transmitting part 25 of the transmitting terminal 1, the packet receiving part 12 of the receiving terminal 2 receives the packets.

When the packet receiving part 12 starts receiving the packets, the moving average calculating part 13 of the receiving terminal 2 calculates the moving average of jitter from the time of transmission of each packet and the time of packet reception. Incidentally, let it be assumed that the information indicating the time of packet transmission is contained in each packet being sent.

That is, as shown below, packet transmission and reception time intervals are detected and the transmission time interval is subtracted from the reception time interval to obtain jitter $D_1$.

$$D_i = (R_i - R_{i-1}) - (S_i - S_{i-1}) \quad (1)$$

where: $R_1$ is an i-th packet receiving time;
$R_{i-1}$ is an (i–1)th packet receiving time;
$S_1$ is an i-th packet transmitting time;
$S_{i-1}$ is an (i–1)th packet transmitting time.

Then, after calculating the jitter $D_i$ as described above, the moving average calculating part 13 of the receiving terminal 2 substitutes the jitter $D_i$ into the following equation defined in RTP (Real-time Transport Protocol, RFC1889) standardized by IETF to thereby calculate jitter moving average $J_i$ concerning the i-th packet.

$$J_i = J_{i-1} + (|D_i| - J_{i-1})/16 \quad (2)$$

Here, the value of jitter, even under a good communication condition in the radio environment, may sometimes become a large negative value when the error correcting mechanism performs bit error correcting if a bit error arises. This is a phenomenon that occurs because the delay caused by the error correcting mechanism is eliminated in the data link layer to provide matching of the overall throughput. Since Equation (2) performs the calculation by use of an absolute value of the jitter $D_i$, however, even if the communication condition is good, the negative-valued jitter of a large absolute value is judged merely as indicating that the radio path is in a bad condition. This constitutes an obstacle to an efficient use of the bandwidth.

In contrast thereto, when the communication condition in the radio environment becomes worse and the negative-valued jitter of a large absolute value becomes negative-valued jitter of a small absolute value as the result of jitter having increased, the moving average calculated therefrom becomes small and the bad communication condition may not be properly judged in some cases.

To avoid this, when the moving average calculating part 13 of the receiving terminal 2 calculates the jitter moving average $J_i$ by use of Equation (2), it calculates the jitter moving average taking into account not only negative- but also positive-valued jitter (which moving average will hereinafter be denoted by $J_i^*$) and, at the same time, calculates a jitter moving average taking into account only positive-valued jitter (which moving average will hereinafter be denoted by $J_i^+$). (Assume that when jitter becomes negative-valued, the jitter moving average associated with the immediately preceding packet is used.)

When the moving average calculating part 13 has calculated the two kinds of moving averages $J_i^*$ and $J_i^+$ as mentioned above, the reception state transmitting part 12 of the receiving terminal 2 sends the two kinds of jitter moving averages $J_i^*$ and $J_i^+$, as a report indicating the reception state, to the transmitting terminal 1.

The reception state receiving part 22 of the transmitting terminal 2 receives the report sent from the reception state transmitting part 14 of the receiving terminal 2.

When the report is received by the reception state receiving part 22, the path state evaluating part 23 of the transmitting terminal 1 detects the jitter moving averages $J_i^*$ and $J_i^+$ from the report and, based on these jitter moving averages $J_i^*$ and $J_i^+$, predicts an available bandwidth on the radio path.

More specifically, the available bandwidth on the radio path is predicted as described below.

Figure 2:
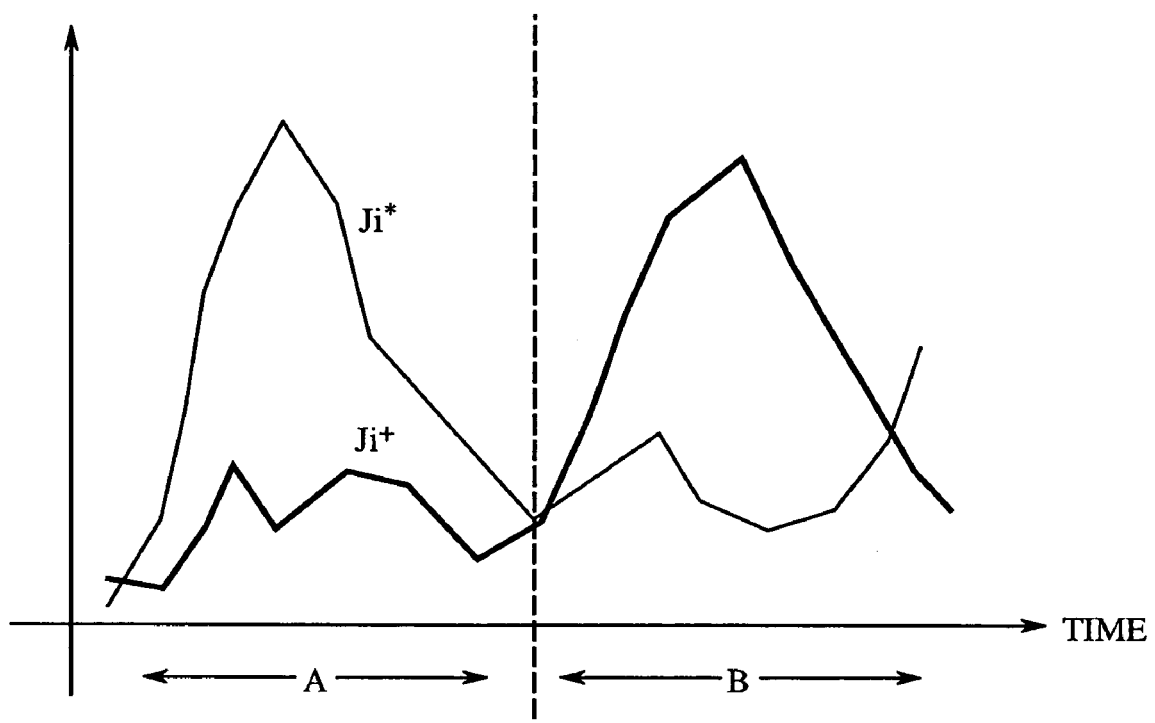
FIG. 2 is an explanatory diagram showing variations in a moving average of jitter.

In the first place, the path state evaluating part 23 compares the jitter moving averages $J_i^*$ and $J_i^+$. At this time, there are cases where $J_i^* > J_i^+$ as indicated in a time period A in FIG. 2 and where $J_i^* < J_i^+$ as indicated in a time period B.

In the time period A, it is considered that the bit error correcting processing by the error correcting mechanism on the radio path brings forward the case where jitter takes many negative values of large absolute values. Hence, it is preferable to predict the available bandwidth based on the moving average $J_i^+$ rather than to predict the available bandwidth based on the moving average $J_i^*$. That is, the bandwidth is calculated substituting the moving average $J_i^+$ for a variable x of a function R(x) for calculating the available bandwidth. Incidentally, no particular limitation is imposed on the function R(x), but the function R( ) disclosed in Pat. Appln. Laid-Open Gazette No. 2001-23080, for instance, is used.

As a result, it is possible to avoid the possibility of the available bandwidth being evaluated to be narrower than in the actual communication condition.

On the other hand, in the time period B it is considered that jitter takes many negative values small in absolute value; hence, it is preferable to evaluate the moving average $J_i^+$ as well as $J_i^*$. To this end, the bandwidth is calculated substituting the moving average $J_i^*$ for the variable x of the function R(x) and, at the same time, the bandwidth is calculated substituting the moving average $J_i^+$ for the variable x of the function R(x). Then, as shown below, the bandwidth $R(J_i^*)$ and the bandwidth $R(J_i^+)$ is averaged, and the average value R' is determined as a final available bandwidth.

$$R' = [R(J_i^*) + R(J_i^+)]/2 \quad (3)$$

As a result, even if the communication condition is poor, when a desired bandwidth does not become narrow, it can be reduced to an appropriate value.

When the path state evaluating part 23 predicts the available bandwidth, the delivery control part 24 of the transmitting terminal 1 controls the amount and send interval of packets to be sent from the packet transmitting part 25 in accordance with the predicted available bandwidth. For example, if the available bandwidth is wide, the amount of packets to be sent is increased and the send interval is shortened, whereas when the available bandwidth is narrow, the amount of packets to be sent is decreased and the send interval is lengthened.

The packet transmitting part 25 of the transmitting terminal 25 sends packets to the receiving terminal 2 under the control of the delivery control part 24.

As is evident from the above, according to the first embodiment, the receiving terminal 2 calculates the moving average of jitter from the transmission and reception times of each received packet and sends the calculated jitter moving average to the transmitting terminal 1, and the transmitting terminal 1 predicts the available bandwidth on the radio path based on the received jitter moving average; hence, it is possible to make an appropriate delivery of packets in accordance with the radio environment.

SECOND EMBODIMENT

While the first embodiment has been described to predict the available bandwidth on the radio path without specifying any particular radio communication scheme, it is also considered preferable to change the available bandwidth according to the radio communication scheme used.

Then, a second embodiment will be described to predict the available bandwidth taking into account the radio communication scheme used.

In the second embodiment the transmitting terminal 1 calculates a difference between a jitter moving average calculated taking into account positive-valued jitter alone and a jitter moving average calculated taking into account not only the positive- but also negative-valued jitter, and updates the previous predicted value in accordance with the ratio of the difference to a predetermined threshold value.

More specifically, in the first place, the path state evaluating part 23 of the transmitting terminal 1 calculates fluctuations $\Delta$ in the available bandwidth by substituting into the following Equation (4) the moving averages $J_i^*$ and $J_i^+$ calculated by the receiving terminal 2. Incidentally, $\beta$ in Equation (4) is a threshold value preset in accordance with the radio communication scheme used.

In the case where $|J_i^* - J_i^+| < \beta$:

$\Delta = |J_i^* - J_i^+|/\beta$

In the case where $|J_i^* - J_i^+| \geq \beta$:

$\Delta = 1$ \hfill (4)

And, the path state evaluating part 23 of the transmitting terminal 1 substitutes the fluctuations $\Delta$ in the available bandwidth into the following Equation (5) to thereby predict the available bandwidth on the radio path. Incidentally, W in Equation (5) is the previous predicted value and W' is the newly predicted available bandwidth. Further, k is a positive constant preset in accordance with the radio communication scheme used.

$W' = W(1 - \Delta/k)$ \hfill (5)

THIRD EMBODIMENT

In the first and second embodiments described above, the delivery control part 24 of the transmitting terminal 1 controls the amount and send interval of the packets to be sent from the packet transmitting part 25 based on the available bandwidth predicted by the path state evaluating part 23, but provision may also be made for the transmitting terminal 1 to indicate a packet error correcting scheme to the receiving terminal 2 in accordance with the available bandwidth.

That is, when the communication condition in the radio environment becomes worse, the error correcting mechanism in the data link layer or the lower layer performs the error correcting processing, resulting in an increase in the number of packets waiting for delivery in a base station or halfway (at a router or the like) on the communication path; too large a number of packets waiting for delivery causes packet losses in the base station and halfway on the communication path. This calls for further error correcting processing for the packets lost.

There are some methods of correcting packets thus lost. It is possible to use, for example, a packet resending method that indicates the loss of packet to the transmitting terminal 1 and resends the packet to the receiving terminal 2, or a method in which the transmitting terminal 1 sends a packet together with redundant information on the packet so that when the packet is lost, the receiving terminal 2 reconfigures the packet based on the redundant information.

The third embodiment gives attention to the latter method.

The latter method requires redundant information about the packet that is sent from the transmitting terminal 1, and if the number of pieces of such redundant information is increased when the communication condition becomes worse, the communication condition is further deteriorated. Accordingly, it is effective means to switch the packet loss correcting method to a method which permits correction of more packets even with the same amount of redundant information. Incidentally, in the case of such a correction method, more pieces of redundant information are not required but the computational complexity increases.

The third embodiment deals with the packet loss by switching the error correcting method to one that enables more errors to be corrected on a step-by-step basis in accordance with the rate of an increase in the jitter moving average being reported. What is meant by "enables more errors to be corrected" is that more packets can be corrected within a certain unit time.

More specifically, this embodiment calculates the available bandwidth in the same manner as in the first and second embodiments described above, and sets a threshold value for the bandwidth and, when the bandwidth exceeds the threshold value, applies a more effective error correcting method.

When the communication condition in the radio environment recovers, the error correcting method is switched back to the initial one with a view to suppressing the delay and computational load caused by the error correction.

FOURTH EMBODIMENT

Figure 3:
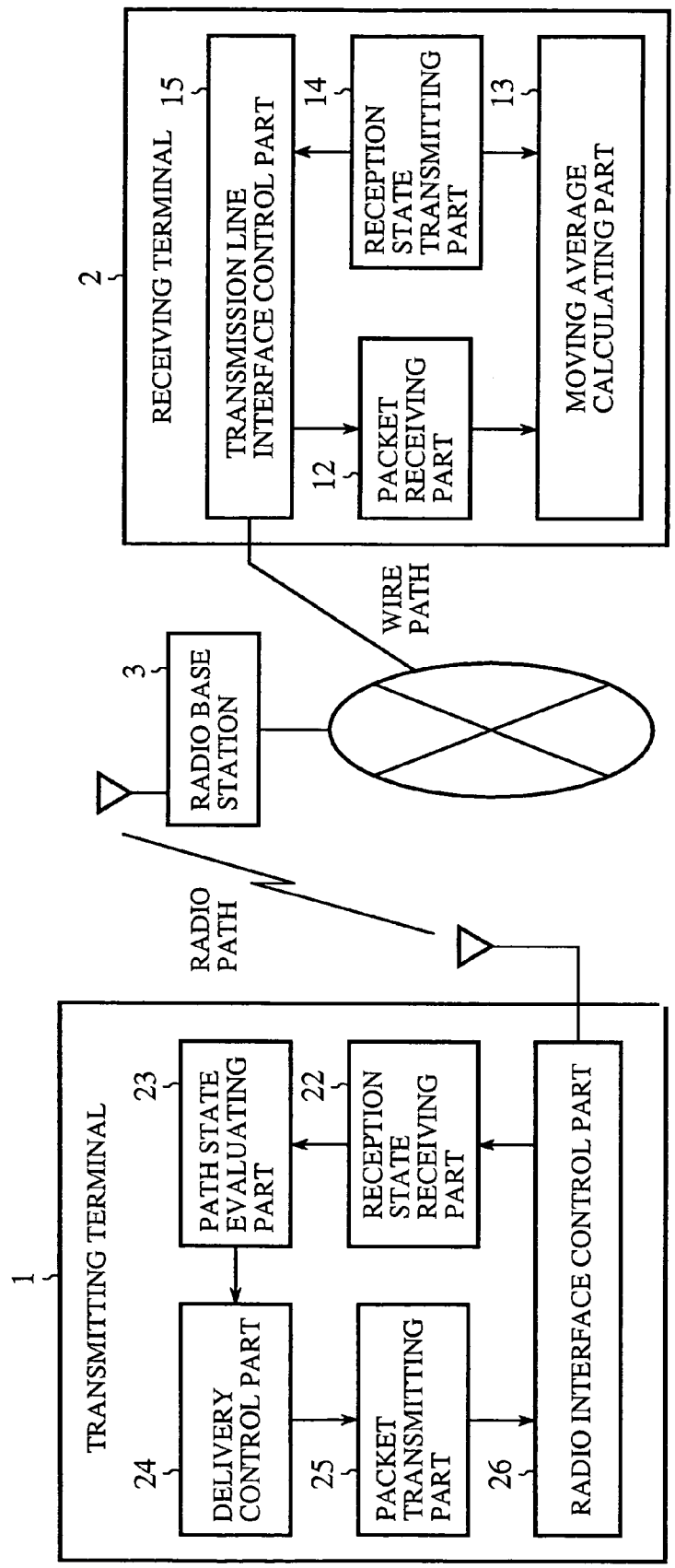
FIG. 3 is a block diagram illustrating a communication system according to a fourth embodiment of the present invention.

While Embodiments 1 to 3 have been described as being applied to the system in which the transmitting terminal 1 is connected to a wire path and the receiving terminal 2 is connected to a radio path, the invention may also be applied to a system in which the transmitting terminal 1 is connected to the radio path and the receiving terminal 2 is connected to the wire path as shown in FIG. 3. In FIG. 3, reference numeral 15 denotes a transmission line interface control part and 26 denotes a radio interface control part.

Figure 4:
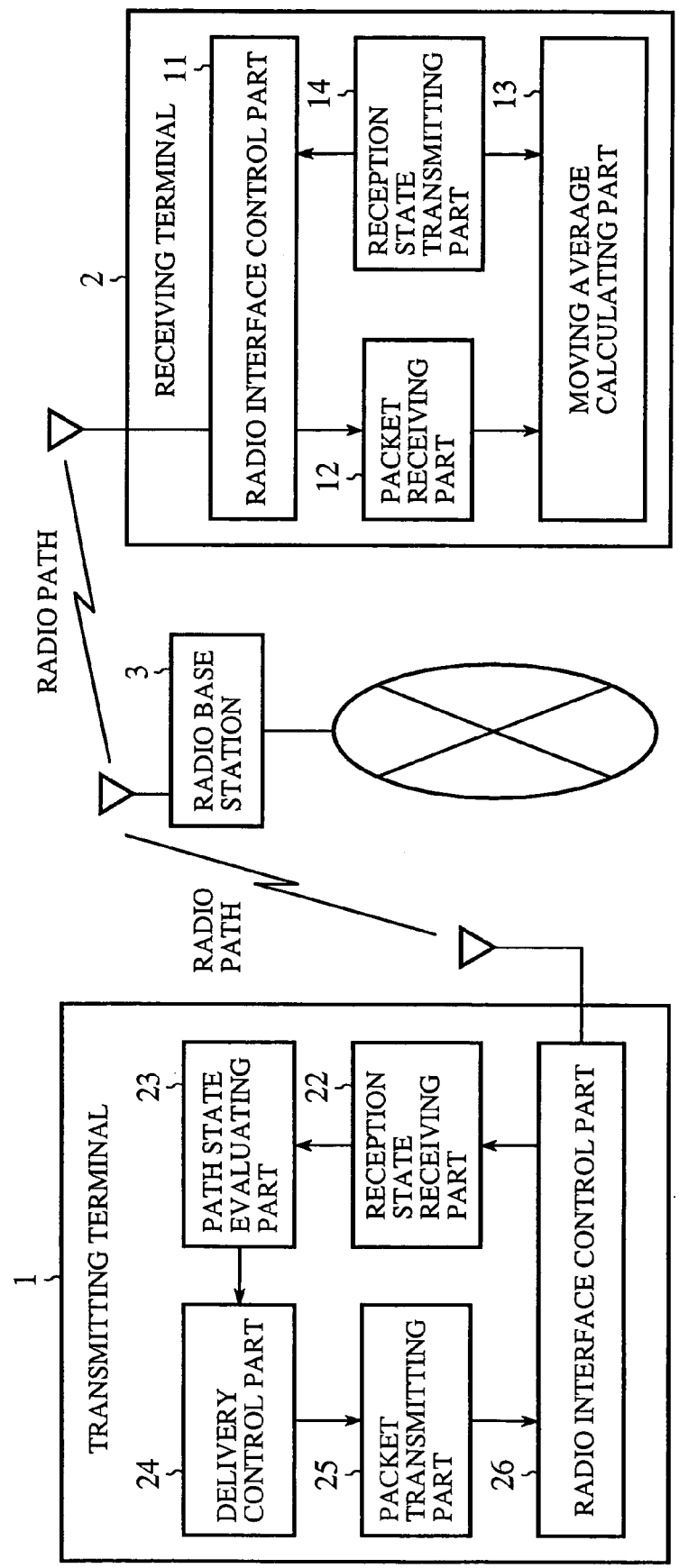
FIG. 4 is a block diagram illustrating a communication system according to a fourth embodiment of the present invention.

Further, the invention may also be applied to a system in which the transmitting and receiving terminals 1 and 2 are both connected to the radio path as depicted in FIG. 4.

Moreover, the invention may also be applied to a system in which the transmitting and receiving terminals are both connected to the wire path and a mobile terminal is present in the communication environment for relaying packets sent from the transmitting terminal 1 to the receiving terminal 2.

FIFTH EMBODIMENT

While the first to fourth embodiments have been described as being applied to the system in which the moving average calculating part 13 of the receiving terminal 2 calculates the jitter moving average and the path state evaluating part 23 of the transmitting terminal 1 predicts the available bandwidth based on the jitter moving average, the invention is not limited specifically thereto but may also be applied to a system in which, for example, the moving average calculating part 13 of the receiving terminal 2 calculates a moving average of a reception delay time, $R_i - R_{i-1}$, from receiving times $R_i$ and $R_{i-1}$ of received packets and sends the calculated moving average to the transmitting terminal 1 and, based on the moving average of the reception delay time, the transmitting terminal 1 predicts the available bandwidth on the radio path. This scheme produces the same effect as the case with the first to fourth embodiments described above.

INDUSTRIAL APPLICABILITY

As described above, the communication systems according to the present invention are suitable for implementation of an efficient packet delivery, taking into account the communication condition on the communication path in the case where a radio path is contained in the communication environment between transmitting and receiving terminals.

The invention claimed is:

1. A communication system, comprising:
a transmitting terminal configured to transmit a plurality of data packets; and
a receiving terminal configured to receive the plurality of data packets,
wherein said receiving terminal is configured to calculate a first jitter moving average from a transmitting time and a receiving time of each packet received by said receiving terminal based on positive-valued jitter and negative-valued jitter, to calculate a second jitter moving average from the transmitting time and receiving time of each packet received by said receiving terminal based only on positive-valued jitter, and to send the first and the second jitter moving averages to said transmitting terminal, and
said transmitting terminal is configured to predict an available bandwidth on a communication path between the transmitting terminal and the receiving terminal based on a comparison of the first and second jitter moving averages.

2. The communication system according to claim 1, wherein the transmitting terminal is configured to predict the available bandwidth based on the second jitter moving average when the first jitter moving average is larger than the second jitter moving average.

3. The communication system according to claim 1, wherein the transmission terminal is configured to predict the available bandwidth based on an average of the first jitter moving average and the jitter moving average when the first jitter moving average is smaller than the second jitter moving average.

4. The communication system according to claim 1, wherein the transmission terminal is configured to determine a difference between the first jitter moving average and the second jitter moving average and to update a previous prediction of the available bandwidth in accordance with a ratio of the difference to a predetermined threshold value.

5. The communication system according to claim 1, wherein the transmission terminal is configured to control an amount of packets to be transmitted based on the available bandwidth.

6. The communication system according to claim 1, wherein the transmission terminal is configured to control a packet send interval based on the available bandwidth.

7. The communication system according to claim 1, wherein the transmission terminal is configured to designate a packet error correcting scheme based on the available bandwidth.

8. The communication system according to claim 1, wherein the transmitting terminal is connected to a wire path and the receiving terminal is connected to a radio path.

9. The communication system according to claim 1, wherein the transmitting terminal is connected to a radio path and the receiving terminal is connected to a wire path.

10. The communication system according to claim 1, wherein the transmitting terminal and the receiving terminal are both connected to a radio path.

11. The communication system according to claim 1, wherein the transmitting terminal and the receiving terminal are both connected to a wire path, and the communication system further comprises a mobile terminal configured to relay the plurality of packets from the transmitting terminal to the receiving terminal.

12. The communication system according to claim 1, wherein the receiving terminal is configured to calculate a moving average of a reception delay time from each packet reception time and to send the moving average of a reception delay time to the transmitting terminal, and
the transmitting terminal is configured to predict the available bandwidth based on the moving average of a reception delay time.

13. A transmitting terminal, comprising:
a transmitter configured to send a plurality of packets to a receiving terminal;
a receiver configured to receive a first jitter moving average and a second jitter moving average from the receiving terminal, the first jitter moving average being based on a transmitting time and a receiving time of each packet received by the receiving terminal, positive-valued jitter, and negative-valued jitter, the second jitter moving average being based on the transmitting time and receiving time of each packet received by the receiving terminal, and only positive-valued jitter; and
a path evaluating unit configured to predict an available bandwidth on a communication path between the transmitting terminal and the receiving terminal based on a comparison of the first and second jitter moving averages.

14. A receiving terminal, comprising:
a receiver configured to receive a plurality of packets from a transmitting terminal; and
a calculating part configured to calculate a first jitter moving average and a second jitter moving average, the first jitter moving average being based on a transmitting time and receiving time of each packet received by the receiving terminal, positive-valued jitter, and negative-valued jitter, the second jitter moving average being based on the transmitting time and receiving time of each packet received by the receiving terminal, and only positive-valued jitter.

* * * * *